June 15, 1954     A. RAPPL     2,681,176
ACCESSORY SYSTEM FOR MOTOR VEHICLES

Original Filed July 26, 1947     2 Sheets-Sheet 1

INVENTOR
Anton Rappl
BY
Bean, Brooks, Buckley & Bean
ATTORNEYS

June 15, 1954  A. RAPPL  2,681,176
ACCESSORY SYSTEM FOR MOTOR VEHICLES
Original Filed July 26, 1947  2 Sheets-Sheet 2
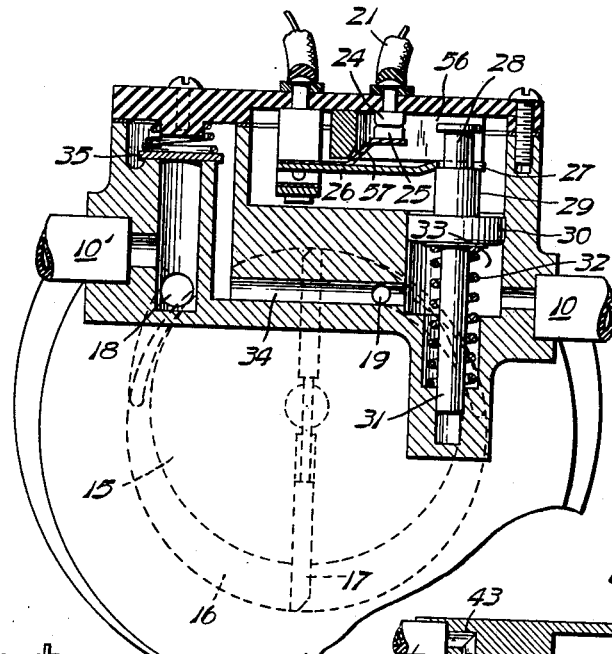
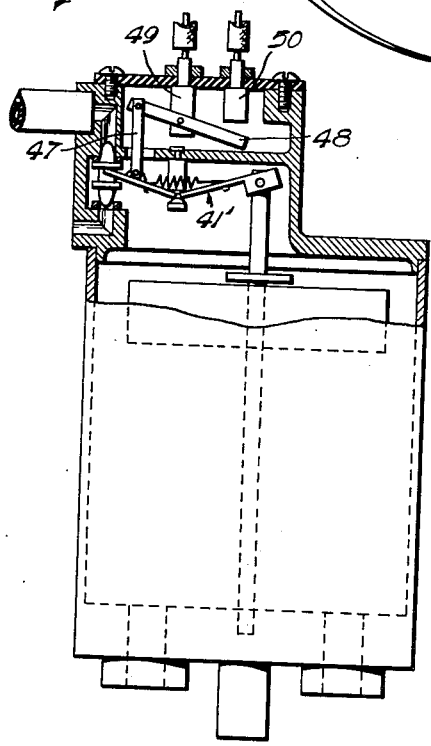
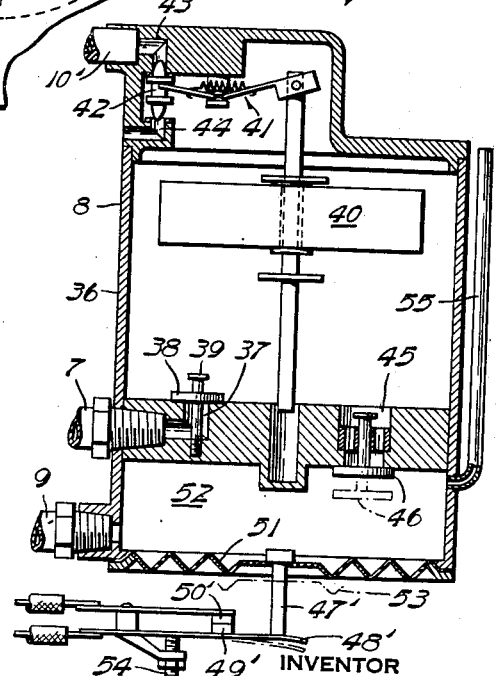
INVENTOR
Anton Rappl
BY
Bear, Brooks, Buckley & Bear
ATTORNEYS Patented June 15, 1954

2,681,176

UNITED STATES PATENT OFFICE 2,681,176

ACCESSORY SYSTEM FOR MOTOR VEHICLES

Anton Rappl, Eggertsville, N. Y., assignor to Trico Products Corporation, Buffalo, N. Y.

Original application July 26, 1947, Serial No. 763,839. Divided and this application July 6, 1950, Serial No. 176,931

9 Claims. (Cl. 230—18)

This invention relates to a pressure or suction generating pump designed for serving as an auxiliary or secondary source of operating pressure in an automotive accessory system wherein the primary source of operating pressure is fluctuating in character, such as might be found in the intake manifold of the vehicle engine.

The primary object of this invention is to provide a practical source of operating pressure which is normally disposed inoperative but will quickly function upon demand during intervals when the manifold source of fluctuating pressure is insufficient for practical accessory operation. Again, the invention resides in a novel pressure generating unit which is simple in design, efficient in use, and automatic in operation.

The invention further has for its object to provide a novel pressure generating unit wherein a control switch which is responsive to the intake manifold pressure is caused to operate in a manner to avoid arcing due to any uncertainty in the pressure responsive action of the control switch.

This application is a division of my application Ser. No. 763,839 filed July 26, 1947, now Patent No. 2,625,212, January 13, 1953.

The foregoing and other objects will manifest themselves as the following description progresses, reference being had to the accompanying drawings, wherein:

Fig. 3 is a cross sectional view through the pressure responsive control for the pressure generating unit;

Fig. 4 is a vertical sectional view through the vacuum tank; and

Fig. 5 is a view partly in section of a modified tank.

Figure 1:
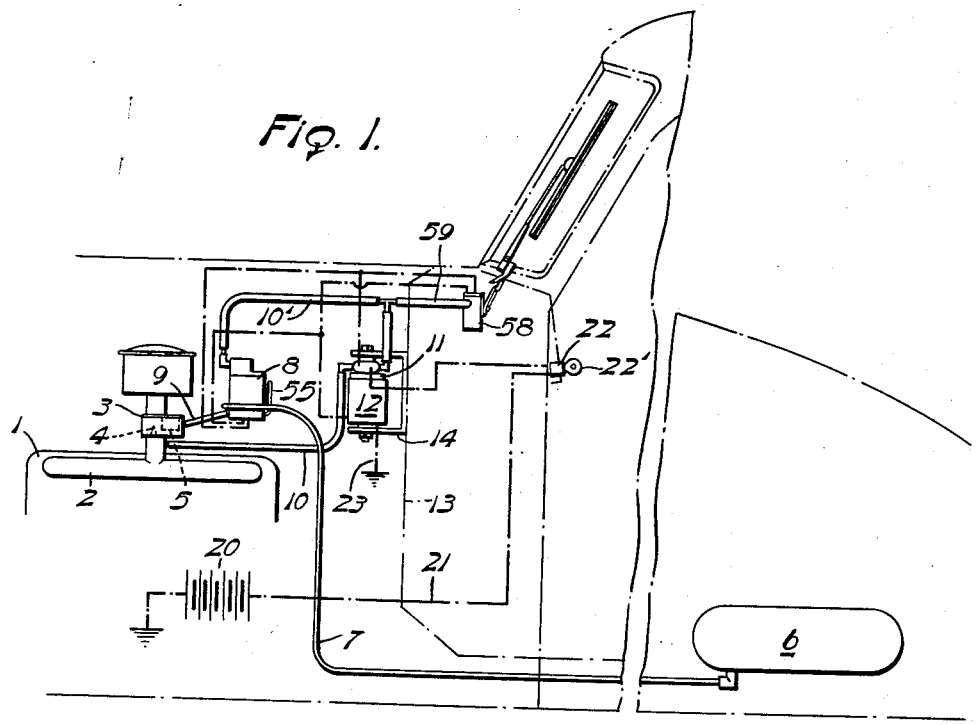
Fig. 1 is a diagrammatic view showing, by way of illustration, an accessory system embodying a pressure generating unit constructed in accordance with the present invention.
Figure 2:
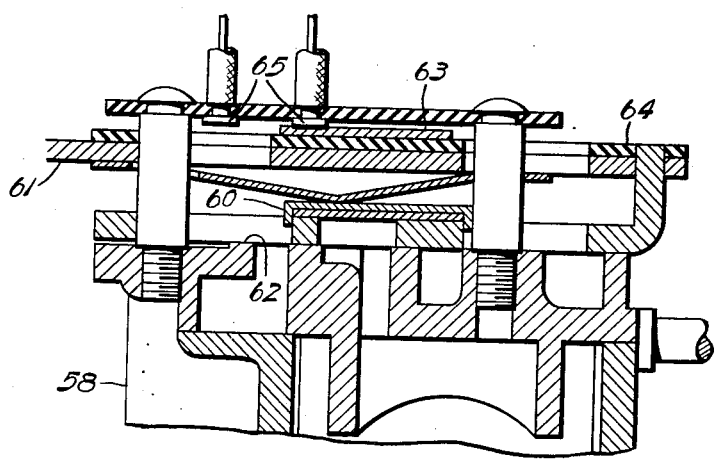
Fig. 2 is a detailed sectional view through the control switch of a secondary accessory.

Referring more particularly to the drawings, the numeral 1 designates a motor vehicle engine having an intake manifold 2 and a carburetor 3 which has a jet or nozzle 4 leading from the usual float chamber 5. A fluid actuated accessory, such as a fuel supply tank 6, is connected by a pipe 7 to a vacuum or gravity-flow tank generally indicated at 8 which is elevated to deliver fuel to the carburetor by gravity through the pipe 9. The fuel is pneumatically lifted to the vacuum tank by the pressure differential between the outside atmosphere and an engine-provided pressure, such as the suction influence derived from the intake manifold. This suction influence is communicated through a pipe 10 to the vacuum tank 8, and interposed in such passage 10 is the pressure generating unit of the present invention and serving herein as an auxiliary source of negative pressure including a pump 11 driven by an electric motor 12.

This pressure generating unit is conveniently mounted on the fire wall 13 of the motor vehicle by a bracket 14. The pump may be of any approved style, that illustrated in Fig. 3 having a rotor 15 eccentrically mounted within a chamber 16 and carrying impeller blades 17 for intaking air through an inlet port 18 and expelling it through an outlet port 19. The motor is electrically driven from a source of electricity 20 to which it is connected by circuit wires 21 and a key controlled switch 22, which latter may be the ignition switch of the engine. The motor is grounded as at 23. Also interposed in the motor circuit is a pressure responsive switch which, as shown in Fig. 3, has a fixed contact 24 and a movable contact 25 carried by an arm 26. The outer end of the arm is slotted as at 27 to receive the neck 28 of a stem 29 which in turn is operatively connected to a pressure responsive member 30 in the form of a plunger. The plunger is suitably guided by its rod 31 and is urged upwardly to a circuit closing position by the coil spring 32. However, under normal conditions of sufficient manifold suction, the plunger is withdrawn against the action of the spring 32 so as to open the switch 24, 25. The plunger works in a chamber 33 from which the passage 10 leads to the intake manifold. Also communicating with this chamber is the pump delivery port 19 which opens into a shunt passage 34 designed to shunt the airflow around the pump when the manifold suction is of a predetermined intensity. A spring seated check valve 35 is provided in the shunt passage so as to prevent reverse flow through the shunt between the outlet and inlet of the pump. Communicating with the pump inlet 18 is an accessory connected passage 10' which extends to the vacuum tank 8. In the absence of manifold suction the pressure responsive switch is in closed condition so that whenever the ignition switch 22 is turned on by the key 22' the motor driven pump will respond immediately to evacuate the passage 10' and lift fuel from the supply tank to the vacuum tank should the fuel supply in the latter need replenishment.

The vacuum tank has a suction chamber 36 for receiving the fuel directly from the supply tank through an inlet port 37 that is normally closed by the valve 38 slidably guided on a stem 39. Arranged within the suction chamber 36 is a float 40 serving to actuate a snap-action 41 for moving the valve element 42 to close the suction port 43 and simultaneously open the vent port 44 when the level of the liquid fuel within the float chamber 36 rises sufficiently. With the float chamber vented to the atmosphere, the liquid fuel will gravitate from the chamber 36 through an outlet 45 to the carburetor. The outlet opening 45 will be closed by a valve 46 during replenishment of the fuel supply in the chamber 36

As the fuel level in the vacuum tank lowers, the float 40 will follow so as to trip the snap action 41 at a predetermined point in its descent to close the atmospheric vent 44 and reopen the suction communication 43 to the intake manifold. As the manifold suction influence is available, it will serve to refill the vacuum tank. However, should the vehicle power plant consume fuel faster than the manifold suction can supply it, the auxiliary source will come into action to make up the deficiency and thereby insure a prompt replenishment of the fuel supply in the chamber 36.

To this end a second switch is arranged in series with the first switch 24, 25 to confine the operation of the motor 12 to intervals of dire necessity and preclude its operation during intervals of low manifold suction when the fuel supply in the vacuum tank is ample. This second switch is responsive solely to the condition of the fuel supply. Consequently the suction or pressure responsive switch and the fuel supply responsive switch coordinate in the functioning of the auxiliary pressure supply. The fuel controlled switch may respond to the level of the fuel in the chamber 36, as shown in Fig. 5, wherein the float actuated snap action 41' is connected by a link 47 to the switch arm 48 for closing the electric circuit through the terminals 49 and 50.

Or the fuel controlled switch may respond to the weight or pressure of the fuel on a movable member, such as a piston-like member or diaphragm 51 movable within a chamber 52. This chamber 52 may form a part of the carburetor itself or, as illustrated, it may form a part of the vacuum tank. Or it could be located in a separate chamber interposed at any suitable point in the passage 9. The flow of fuel from the vacuum chamber 36 is through the chamber 52 and consequently the latter will be normally maintained full as long as there is any fuel in the chamber 36. The movable wall 51 is connected by a link 47' to the switch arm 48' for closing the electric circuit through the contacts 49' and 50' when the weight or pressure of the fuel on the wall lessens beyond a predetermined degree. Normally the wall is depressed by the fuel load, as at 53, to open or break the circuit by separating the contacts 49' and 50'. The response of the diaphragm 51 may be regulated by a tension screw 54 which is preferably set to close the electric circuit when the fuel level is within the chamber 52. When the circuit is so closed during the prolonged period of engine acceleration, at which time the manifold vacuum is insufficient, the electrically driven pump 11 will supply an adequate degree of pressure for quickly lifting the fuel from the supply tank 6 to the chamber 36. During this period of pump operation the valve 46 will be drawn to its seat by the difference between the atmospheric pressure in chamber 52 and the partial vacuum in the suction chamber 36. However, this will not retard the gravity flow of fuel from the chamber 52 to the carburetor float chamber because of the special provision of a small bleed or atmospheric vent 55. Therefore, the operation of the engine will be sustained throughout the fuel replenishment, and when the chamber 36 has refilled and the float actuated valve 42 reopens the chamber to the atmosphere, the fuel in the chamber 36 will readily flow through the outlet opening 45 and fill the chamber 52.

From the foregoing it will be observed that the auxiliary source of operating pressure will only function when the immediate fuel supply is dangerously low and that at other times it will remain idle regardless of the fluctuation of the manifold pressure influence. Therefore, the fuel conditioned switch must cooperate with the pressure conditioned switch in maintaining a uniform head of fuel for continuous and uninterrupted engine operation, with the elimination of frequent and unnecessary wear and tear on the battery which might result were the auxiliary pressure supply wholly dependent upon the manifold influence for its control.

Arcing between the contacts 24 and 25 may be eliminated by the use of a snap action, or a permanent magnet, such as the horeshoe magnet 56, may be provided to magnetically hold the arm 26 until the pull by the pressure responsive member 30 dominates, whereupon the contact 25 will snap away from the fixed contact by reason of the spring leaf 57 which resiliently supports the former contact on the arm 26.

The accessory system is efficient and tends to conserve the supply of electrical energy and thereby will encourage the use of other accessories in the system, such as the windshield cleaner which has its suction operated motor 5 connected to the accessory connected passage 10' by the passage 59. This motor may be of any approved form and be under the control of a valve 60 having a handle 61 extending to an accessible point. When the valve is slid on its seat 62, a bridging contact 63 carried thereby but insulated therefrom by a layer 64, will serve to bridge the two contacts 65 in a circuit closing manner to energize the electric motor 12 when the pressure responsive switch 24, 25 is closed. Otherwise, the manifold pressure influence will serve to operate the windshield cleaner. The operation of the windshield cleaner is therefore assured.

The electrically driven pump unit is of simple construction and is readily installed as a unit for providing ample operating pressure for the accessory system while permitting the engine manifold to effectively actuate the accessory system when its influence is of a predetermined intensity. Two accessories, namely the fuel feeding system and the windshield cleaner system, have been shown, but it is obvious that additional accessories may be incorporated since the high speed rotary pump will provide ample operating pressure for two or more of the accessories concurrently. The fact that the auxiliary source of pressure is connected into the ignition switch serves to preclude operation of the pump whenever the motor vehicle is parked.

While the foregoing description has been given in detail it is without thought of limitation since the inventive principles involved are capable of assuming other physical embodiments without departing from the spirit of the invention and the scope of the appended claims.

What is claimed is:

1. A pump unit comprising a pump chamber having an inlet port and an outlet port, a shunt passage connecting the two ports, a valve interposed in the shunt passage precluding reverse flow of fluid therethrough, a switch carried by the unit and having a part responsive to the pressure in one port for opening the switch, and a magnet acting on the switch to delay the latter in its opening movement by the pressure responsive part until the latter dominates, whereby to effect a quick actuation of the switch.

2. A pump unit comprising a pump chamber having an inlet port and an outlet port, a switch carried by the unit and having a part responsive to the pressure in one port for opening the switch, and a permanent magnet acting on the switch to delay the latter in its opening movement by the pressure responsive part until the latter dominates, whereby to effect a quick actuation of the switch.

3. A suction pump unit comprising a pump chamber having an inlet port and an outlet port, a switch carried by the unit and having a movable circuit opening part and a connected movable part responsive to the pressure in the outlet port for opening the switch, and a permanent magnet acting to delay the switch in its opening movement by the pressure responsive part until the latter dominates, whereby to effect a quick actuation of the switch.

4. A pressure generating unit comprising a rotary pump having a housing, an inlet and an outlet communicating with the pump chamber, a shunt passage connecting the inlet and outlet in a manner to bypass the chamber, a check valve in the shunt passage compelling fluid flow therethrough uni-directionally from the inlet to the outlet, a rotary electric motor arranged coaxially of the pump for operating the same and mountable therewith as a unit, a switch connected in circuit with the motor, and means in the pump housing responsive to the fluid pressure for operating the switch, said means being connected to the switch by a play connection affording limited independent movement of the fluid responsive means.

5. A pressure generator comprising a pump having an inlet and an outlet communicating with the pump chamber, an electric motor for operating the pump, a switch connected in circuit with the motor and having a permanent magnet acting to attract the switch to its circuit closing position, and a member responsive to the fluid pressure and connected by a last motion to the switch for opening it against the magnetic force.

6. A pressure generating device for motor vehicle accessory systems, comprising a combined motor pump unit mountable and demountable as a unit, a switch connected in circuit with the motor and having a contact arm movable to a circuit closing position for controlling its operation, a shunt passage connecting the inlet to the outlet in a manner to bypass the pump chamber, a check valve arranged in the shunt passage for directing fluid flow therethrough from the inlet to the outlet, a permanent magnet acting to hold the contact arm in a closed position, and means responsive to the fluid pressure for controlling the switch, said responsive means being joined to the contact arm by a lost motion coupling to enable the arm responding to the magnetic force independently of the responsive means.

7. A pressure generating system comprising a pump, a motor for actuating the pump, a switch connected in circuit with the motor for controlling its operation and having a contact arm movable to a circuit closing position, a magnet acting on the arm as an armature for attracting the same to its circuit closing position, and pressure responsive means for controlling the switch and connected to the switch by play connection for enabling independent preliminary operation of said means in opening the switch and for enabling independent closing movement of the contact arm following a predetermined movement of the pressure responsive means therewith.

8. A pressure generating unit for motor vehicle accessory systems, comprising a pump having a housing, a motor for actuating the pump carried by the housing, a switch on the housing connected in circuit with the motor for controlling its operation, a shunt passage connecting the inlet to the outlet in a manner to bypass the pump chamber, a check valve arranged in the shunt passage for directing fluid flow therethrough from the inlet to the outlet, means responsive to the fluid pressure for controlling the switch, and means for securing a quick opening and closing of the switch by said pressure responsive means.

9. A pressure generating device for motor vehicle accessory systems, comprising a combined motor pump unit having a pressure passage, a switch connected in circuit with the motor and having a contact arm movable to a circuit closing position for controlling its operation, a permanent magnet acting to hold the contact arm in a closed position, and means responsive to the fluid pressure in the passage for controling the switch, said responsive means being joined to the contact arm by a lost motion coupling to enable the arm to respond to the magnetic force independently of the responsive means.

References Cited in the file of this patent

UNITED STATES PATENTS

| Number | Name | Date |
| --- | --- | --- |
| 930,989 | Richards | Aug. 10, 1909 |
| 2,042,510 | Cornelius et al. | June 2, 1936 |
| 2,110,313 | Warrick | Mar. 8, 1938 |
| 2,520,650 | Oishei et al. | Aug. 29, 1950 |